United States Patent [19]

Dahn et al.

[11] Patent Number: 5,041,347
[45] Date of Patent: Aug. 20, 1991

[54] CHEVREL-PHASE SYNTHESES AND ELECTROCHEMICAL CELLS

[75] Inventors: Jeffrey R. Dahn, Surrey; Harith J. Al-Janaby, North Delta, both of Canada

[73] Assignee: Moli Energy Limited, Canada

[21] Appl. No.: 460,807

[22] Filed: Jan. 4, 1990

Related U.S. Application Data

[60] Division of Ser. No. 227,073, Aug. 1, 1988, Pat. No. 4,917,871, which is a continuation-in-part of Ser. No. 36,287, Apr. 9, 1987, abandoned.

[51] Int. Cl.$^5$ .............................................. H01M 4/58
[52] U.S. Cl. .................................... 429/218; 429/225; 252/182.1
[58] Field of Search ..................... 429/218, 225, 194; 252/182.1

[56] References Cited

U.S. PATENT DOCUMENTS

| | | | |
|---|---|---|---|
| 4,006,107 | 2/1977 | Foner et al. | 423/511 X |
| 4,542,009 | 9/1985 | Palmer | 423/561.1 X |
| 4,751,159 | 6/1988 | Tarascon | 429/219 X |
| 4,778,539 | 10/1988 | Kubo et al. | 148/11.5 P |
| 4,917,976 | 4/1990 | Wakihara et al. | 429/218 |

FOREIGN PATENT DOCUMENTS

233893 3/1986 German Democratic Rep. .

OTHER PUBLICATIONS

Schneider et al., *Chemical Abstracts*, vol. 105, No. 46382, 8/86.
Mulhern et al., "Rechargeable Nonaqueous lithium/-$Mo_6S_8$ Battery", *Canadian Journal of Physics*, v. 62, pp. 527-531, 1984.
McKinnon et al., "Structure and Chemistry of $Li_xMo_6S_8$" *Physical Review B.*, v. 31, No. 5, pp. 3084-3087. 1 Mar. 1985.

*Primary Examiner*—Stephen J. Kalafut
*Attorney, Agent, or Firm*—Lerner, David, Littenberg, Krumholz & Mentlik

[57] ABSTRACT

Methods of making Chevrel-phase materials suitable for use as battery cathodes by heating a precursor composition comprising one or more heat labile compounds of one or more non-molybdenum metals capale of forming a Chevrel-phase material, forming a reaction mixture with molybdenum and a chalcogen or compounds thereof, and further heating said reaction mixture. Chevrel-phase materials having two non-molybdenum metals in which one serves as a filler metal resistant to intercalation. Electrochemical cells incorporating the Chevrel-phase materials disclosed.

10 Claims, 1 Drawing Sheet

CHEVREL-PHASE SYNTHESES AND ELECTROCHEMICAL CELLS

This is a division, of application Ser. No. 07/227,073, filed Aug. 1, 1988, now U.S. Pat. No. 4,917,871, which is a continuation-in-part of application Ser. No. 07/036,287, filed Apr. 9, 1987, now abandoned.

BACKGROUND OF THE INVENTION

The '287 application is entitled "Materials Preparation Technique". The disclosure of '287 application is hereby incorporated by reference herein.

As discussed in greater detail in the '287 application, materials known as Chevrel-phase materials, also called Chevrel compounds, include an invariant portion which may consist essentially of molybdenum and a chalcogen such as sulfur, selenium, tellurium, or mixtures of these with or without minor amounts of oxygen. Ordinarily, the fixed portion has a stoichiometric formula of $Mo_6Z_n$ where Z represents the chalcogen and n is usually between about 7.5 and about 8.5, most typically about 8. The unique crystal structure of the materials permits intercalation of metals, so that the overall stoichiometry of the Chevrel-phase material can be represented as $A_xMo_6Z_n$ where A represents the intercalated metal and x may vary from 0 (no intercalated metal) to an upper limit which may be about 4 or less depending upon the particular metal.

Energy is released upon intercalation of the metal into the Chevrel-phase material and as the intercalation process is partially or wholly reversible with certain metals, the Chevrel-phase materials can be used as cathodes in electrochemical cells. As described in Mulhern et al., "Rechargeable Non-Aqueous Lithium/$Mo_6S_8$ Battery", (Can. J. Phyz., Vol. 62, pp. 527,531, 1984) a cell with a lithium anode and a Chevrel-phase cathode of the formula $Li_xMo_6S_8$ can be subjected to a charge cycle in which lithium is removed from the Chevrel-phase by the applied electrical energy. In a discharge cycle, the lithium is re-intercalated into the Chevrel-phase releasing energy as electrical energy.

Lithium intercalated Chevrel-phase material can be made by first preparing copper intercalated Chevrel-phase $Cu_xMo_6S_8$ by direct reaction between copper, molybdenum and sulfur at elevated temperature and then leaching the copper from the material to prepare the un-intercalated Chevrel-phase $Mo_6S_8$. Lithium is then intercalated into the so-formed $Mo_6S_8$ either chemically or electrochemically. In the latter, the cell as assembled has a cathode of copper intercalated Chevrel-phase material and a lithium anode. On the first discharge cycle, lithium displaces the copper to yield the lithium intercalated material. Likewise, lithium can replace iron or nickel in the corresponding iron intercalated or nickel intercalated Chevrel-phase materials.

One significant aspect of the invention discussed in the '287 application includes the discovery that the lithium-intercalated Chevrel-phase materials can be synthesized directly. Thus, lithium-intercalated cathodes for storage cells can be made without the leaching or controlled discharge step formerly required.

As further disclosed in the '287 application, the reaction mixture containing lithium, molybdenum and sulfur for direct formation of the lithium-intercalated Chevrel-phase materials can be prepared by heating a precursor mixture including a heat-labile lithium compound together with molybdenum and sulfur, typically as a mixture of $MoS_2$ and free Mo. Upon heating, the heat-labile compound yields volatile decomposition products which may be swept from the mixture, as by a stream of inert gas, leaving behind the lithium, molybdenum and sulfur to form the Chevrel-phase material. This approach greatly simplifies the synthesis inasmuch as it avoids the difficulties encountered in dealing with free metallic lithium and permits the use of relatively inexpensive starting materials which can be handled without special precautions.

As reported in Tarascon et al., "Electrochemical, Structural and Physical Properties of the Sodium Chevrel-phases $Na_xMo_6X_{(8-y)}I_y$", J. Solid State Chem., Vol. 66, pp. 204-224, 1987, the intercalation of sodium into Chevrel-phase materials such as $Na_xMo_6S_8$ is only partially reversible, so that sodium can be removed and re-intercalated over the range x=1 to about x=4. As further reported in the Tarascon et al. article, the sodium intercalated Chevrel-phase materials can be employed with a sodium anode to form a secondary or rechargeable storage cell. The sodium Chevrel-phase materials used in the Tarascon et al. article were prepared by first preparing a copper intercalated material, leaching the copper to provide $Mo_6S_8$ and then conducting a controlled intercalation of the sodium into the un-intercalated material in the electrochemical cell. As will be appreciated, these are essentially laboratory scale procedures which are not suitable for industrial production.

Despite the foregoing developments, however, there have still been needs for further improvements in electrochemical cells incorporating Chevrel-phase cathodes and in synthesis methods for Chevrel-phase materials.

This is because the discharge characteristics are dependent on the cathode material and in particular, for Chevrel-phase materials, on the actual composition of the material. Thus, although some Chevrel-phase materials show considerable change of cell voltage during the discharge, it is possible for example, to select those which are capable of providing good cell capacity with almost no decline in voltage during discharge. For some applications this is a highly desirable feature.

SUMMARY OF THE INVENTION

The present invention addresses these needs. One aspect of the present invention incorporates the discovery that any Chevrel-phase material including an intercalated metal which can be formed by reaction of the intercalated non-molybdenum metal, molybdenum and chalcogen at an elevated temperature can be produced from starting materials including a heat-labile compound of the non-molybdenum metal. Thus, a Chevrel-phase material can be made by heating a precursor composition including one or more heat-labile compounds of one or more non-molybdenum metals to decompose the heat-labile compounds and volatilize the decomposition products from the precursor composition, removing the volatilized decomposition products and forming a reaction mixture including the metal or metals initially present in the heat-labile compounds together with molybdenum and the chalcogen required to form the Chevrel-phase material. This reaction mixture is preferably further heated at an elevated temperature and then cooled. Most preferably, the stoichiometry of the reaction mixture corresponds to the stoichiometry of a Chevrel-phase material, so that the cooled reaction mixture after further heating constitutes a pure Chevrel-phase material.

Preferably, the precursor mixture includes at least a part of the molybdenum and chalcogen components employed in the reaction mixture. The composition of the precursor composition may be selected so that upon decomposition of the heat-labile compounds and removal of the volatilized decomposition products, the remaining components of the precursor composition have stoichiometry corresponding to the desired reaction mixture Thus, the further heating step can follow immediately after the heating and removal of the decomposition products. Alternatively, the precursor mixture may be selected so that upon removal of the decomposition products, the remaining components form an intermediate, and the composition of the intermediate can be adjusted prior to the further heating step, as by addition of molybdenum or chalcogen.

In a sense, this aspect of the present invention constitutes an extension of the process applied to lithium-intercalated Chevrel-phase materials in the '287 application. Thus, similar benefits can be obtained in manufacture of other Chevrel-phase materials. The heat-labile metal compounds utilized according to this aspect of the present invention preferably are stable in air at ambient temperatures and preferably decompose at temperatures lower than those required for the further heating step. Also, the decomposition products released from the heat-labile compounds preferably are substantially unreactive with the molybdenum and chalcogen components. Many common inorganic salts of a wide variety of metals such as the carbonates, bicarbonates, sulfates and the like exhibit these characteristics. Preferably, the molybdenum and chalcogen components are provided in forms which are likewise stable in air at ambient temperatures such as molybdenum disulfide and free molybdenum. Thus, the entire precursor composition can be blended without expensive, special precautions and loaded in a reaction vessel by ordinary techniques without the need for any inert gas blanket or the like during the loading operation. This aspect of the present invention thus affords simple and economical methods for making Chevrel-phase materials starting from stable, readily handled industrial chemicals available at low cost.

A further aspect of the present invention includes the discovery that useful electrochemical cells can be made with a lithium-containing anode and a cathode incorporating a Chevrel-phase material having a permanently intercalated non-molybdenum metal other than lithium. Thus, the Chevrel-phase materials utilized in cells according to this aspect of the present invention have stoichiometry corresponding to the formula $Li_xM_qMo_6Z_n$, where x is 0 or above and varies with the state of charge of the cell, M is a metal other than lithium or molybdenum, q is between about 0 and about 1.0, Z is a chalcogen and n is typically between about 7.5 and about 8.5, preferably about 8.0. The metal M most preferably is substantially resistant to replacement by lithium upon intercalation of lithium into the Chevrel-phase material during discharge of the cell. Also, the metal M may be substantially resistant to removal from the Chevrel-phase material by electrochemical action, as by applied voltage during charging of the cell. Cells incorporating such cathodes provide good cell capacity with almost no decline in voltage during discharge. This feature is especially useful for circuits sensitive to voltage variations.

The non-molybdenum, non-lithium metal M may be regarded as permanently filling some of the sites within the Chevrel-phase crystal structure which would otherwise be occupied by lithium in the comparable ternary lithium-molybdenum-chalcogen Chevrel-phase. Thus, the term "filler metal" is used in this disclosure with reference to the non-lithium, non-molybdenum metal incorporated in a Chevrel-phase material.

Sodium may serve as a filler metal, and the sodium-intercalated material can be used in a cell with a lithium-containing anode. During cycling of the cell, lithium is intercalated into the Chevrel-phase material and removed therefrom so that the stoichiometry of the Chevrel-phase material corresponds to $Li_xNaMo_6S_8$, with x ranging from about 0 to about 3.

This aspect of the present invention includes the further discovery that those Chevrel-phase materials incorporating a filler metal and having rhombohedral crystal structures with rhombohedral angels less than about 90° tend to resist displacement of the filler metal by intercalated lithium. Where the filler metal M is selected from the group consisting of Ba, Ca, K, Na, Pb and Sn, and more preferably from the group consisting of Ca and Na, the Chevrel-phase material $M_1Mo_6S_8$ will have the preferred rhombohedral structure and preferred rhombohedral angles of less than about 90°, and will resist displacement of the filler metal M.

Cells according to this aspect of the present invention can be fabricated by synthesizing the Chevrel-phase material with the filler metal and then assembling the Chevrel-phase material with the appropriate lithium-containing anode and electrolyte. There is no need for any controlled discharge or displacement step.

Yet another aspect of the present invention provides, as new compositions of matter, Chevrel-phase materials incorporating intercalated lithium together with a permanently incorporated filler material resistant to displacement by intercalated lithium. These materials are useful as cathodes in cells as aforementioned.

Other objects, features and advantages of the present invention will be more readily apparent from the detailed description of the preferred embodiments set forth below taken in conjunction with the accompanying drawing.

BRIEF DESCRIPTION OF THE DRAWINGS

The sole FIGURE in the drawing is a graph of cell voltage against cathode composition.

DETAILED DESCRIPTION OF THE PREFERRED EMBODIMENTS

Figure 1:
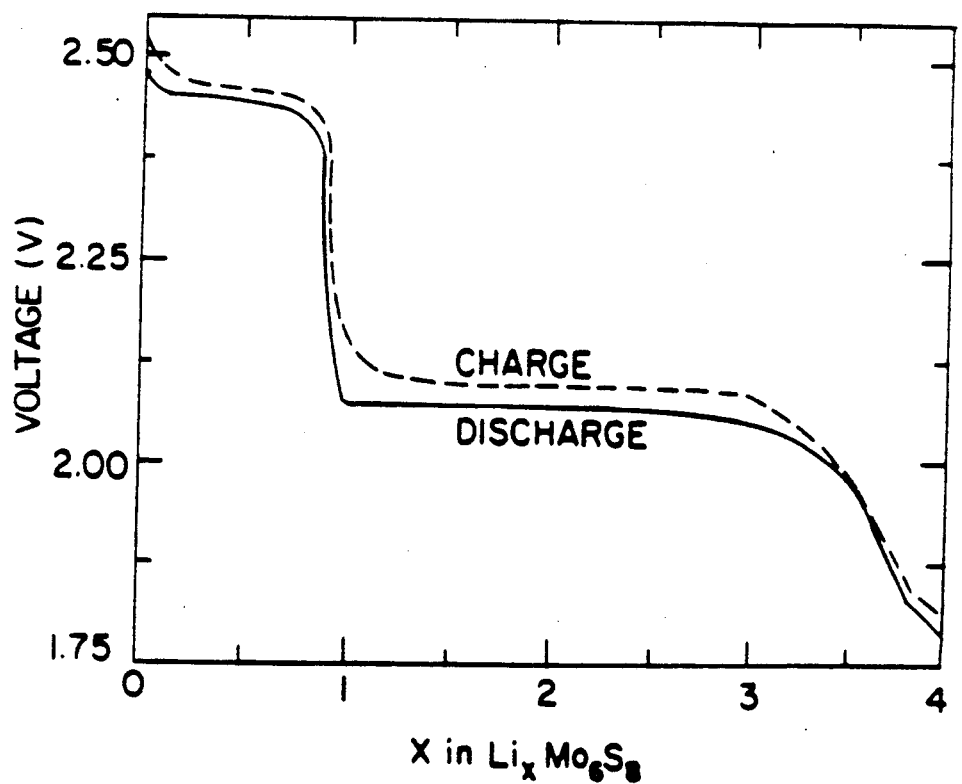

In a process according to one embodiment of the present invention, a precursor composition incorporating one or more heat-labile compounds of a non-molybdenum metal capable of forming a Chevrel-phase material is employed. Metals capable of forming Chevrel-phase materials are known to those skilled in the art and include silver, barium, calcium, iron, copper, cobalt, cadmium, iridium, lithium, potassium, magnesium, manganese, nickel, sodium, lead, tin and zinc and combinations thereof. Desirably, the precursor composition also includes molybdenum, chalcogen or, most preferably, both. The molybdenum and chalcogen may be provided as free elements, as heat-labile compounds or as other compounds such as molybdenum chalcogenides. The molybdenum and chalcogen may also be provided as mixtures of free molybdenum or free chalcogen with the aforementioned compounds.

The heat-labile compounds included in the precursor mixture should be selected so that their decomposition products do not react substantially with the other constituents of the precursor composition at the temperatures required for decomposition of the heat-labile compounds. Preferably, all of the constituents in the precursor mixture are stable in air at ambient temperatures and hence all of the constituents can be handled, blended with one another and loaded into a reaction vessel in air at ambient temperature, without special precautions such as an inert gas blanket or the like.

The reaction vessel is purged with an inert gas, evacuated as by a suitable vacuum pump, or both to provide a substantially inert atmosphere surrounding the precursor composition. As used in this disclosure, the term "inert atmosphere" means an atmosphere which does not substantially react with the molybdenum, the non-molybdenum metal or the chalcogen under the conditions employed in the heating step or further heating step discussed hereinbelow. Thus, suitable inert atmospheres would include the noble gases, and would also include nitrogen. Moreover, suitable inert atmospheres would also include any atmosphere of sufficiently low pressure that there is no appreciable interaction between the gases constituting the atmosphere and the remainder of the system, i.e., a vacuum.

The heating and further heating steps should be conducted in a reaction vessel which is substantially inert to the reactants and products at the temperatures utilized. Graphite, Silicon Carbide, (SiC), Silicon Nitride ($Si_3N_4$), certain stainless steels and nickel-based alloys of the types sold under the trade designations Inconel 600 and Hastelloy C-276 are preferred as materials of construction for the reaction vessel.

The precursor composition is heated under the inert atmosphere until the mixture reaches a decomposition temperature sufficient to cause decomposition of the heat-labile compound or compounds in the precursor composition. The heating step preferably is continued so as to maintain the precursor composition at the decomposition temperature for a sufficient time to cause substantially complete decomposition of the heat-labile compound or compounds. The heating step can be commenced prior to, concomitantly with or after the purging and/or evacuation steps used to provide the inert atmosphere. However, the inert atmosphere should be applied before the precursor composition attains such temperatures in the heating step as to cause substantial interaction between the precursor composition and the ambient atmosphere. As the heat-labile compound or compounds decompose, they form volatile decomposition products, and these are removed in gaseous form. Preferably, the inert gas purging and/or vacuum pumping steps used to provide the inert atmosphere are continued during the heating step so that the volatilized decomposition products are swept from the reaction vessel and hence removed from the vicinity of the precursor composition as the decomposition products form.

According to one embodiment of the present process, the precursor composition includes all of the molybdenum and all of the chalocogen required to form the desired Chevrel-phase material. Thus, upon heating and removal of the decomposition products, the precursor mixture is directly converted without further addition or removal of consituents, into a reaction mixture suitable for forming a Chevrel-phase material. In a process according to this embodiment of the invention, the further heating step most preferably commences immediately after the heating and removal steps without any intermediate cooling of the reaction mixture. Most desirably, the further heating step is conducted in the same reaction vessel as the heating and removal steps. Indeed, although the heating and further heating steps are referred to separately for purposes of clarity, it should be understood that in this embodiment of the invention, these two steps can be simply different portions of a single, prolonged firing cycle. Accordingly, processes according to this embodiment of the invention are referred to as "single heat" processes.

In processes according to a further embodiment of the invention, the precursor composition includes less than all of the chalcogen or, preferably, less than all of the molybdenum required to form the desired Chevrel-phase material. The constituents remaining after removal of the decomposition products form an intermediate composition.

Chalcogen, molybdenum or both may be added to the intermediate to convert the intermediate into a reaction mixture having the desired stoichiometry, and the reaction mixture is then further heated as in the embodiment discussed above. Typically, the intermediate is cooled and the additional molybdenum and/or chalcogen is blended with the intermediate. As the addition step forms a clear boundary between heating and further heated steps in processes according to this embodiment, processes utilizing an addition step are referred to in this disclosure as "two-heat" processes.

A two-heat process is preferably performed for those heat labile metal compounds capable of oxidizing molybdenum at the decomposition temperature. In such cases the amount of molybdenum and chalcogen in the precursor mixture is limited to an amount sufficient to form the intermediate.

The intermediate in a two-heat process may have the stoichiometric formula $B_qMo_1Z_2$, where B represents the non-molybdenum metal, q is up to about 1 and Z represents chalcogen, preferably sulfur. Intermediates of this form are particularly preferred where the non-molybdenum metal is a Group I metal such as Li or Na, and where the chalcogen is sulfur. Intermediates of this form typically require addition of molybdenum to form a suitable reaction mixture.

The stoichiometry of the precursor mixture is selected so that the products remaining after removal of decomposition products will have the stoichiometry desired in the reaction mixture or intermediate. Many of the common heat-labile metal compounds include chalcogen moieties which are volatilized upon decomposition, and which therefore do not contribute appreciably to the chalcogen content of the reaction mixture or intermediate.

In either the single-heat or two-heat process, the reaction mixture ultimately utilized in the further heating step must be such as to form a Chevrel-phase upon further heating at the elevated temperature for a sufficient period of time.

For the Chevrel-phase material $A_xMo_6Z_n$, x may vary from 0 to 4 in the resulting product, and the material may exhibit several technically separate and distinct phases as the value of x varies. However, as discussed in the '287 application, each phase exhibits an X-ray diffraction pattern indicative of the generally rhombohedral crystal lattice, or corresponding structures, which depends upon the particular chalcogen Z utilized. These individual phases are Chevrel-phases. The term "pure Chevrel-phase material" as used in this disclosure, includes both materials consisting of a single Chevrel-phase and materials consisting of two or more phases, each of which is a Chevrel-phase.

Many Chevrel-phase materials have been synthesized heretofore by direct reaction of mixtures of free elements having stoichiometry corresponding to the stoichiometry of the desired pure Chevrel-phase material. The stoichiometric formula for the reaction mixture utilized in the present invention may be the same as that of the elemental mixtures previously known to form Chevrel-phases upon further heating. Ordinarily, these known elemental mixtures have stoichiometry corresponding exactly to the stoichiometry of the pure Chevrel-phase. Additionally, certain reaction mixtures including non-molybdenum metal and chalcogen in excess of that present in a pure Chevrel-phase material will partition or resolve themselves into a mixture of a Chevrel-phase material and a molybdenum chalcogenide. As set forth in aforementioned '287 application, ternary mixtures including lithium, molybdenum and chalcogen and having the stoichiometric formula $Li_{(4+2y)}Mo_6Z_{(n+y)}$, where n is about 7.5 to about 8.5 and y is 0 or above, will segregate into a Chevrel-phase of the formula $Li_4Mo_6Z_n$ and the separate $Li_2Z$ phase upon further heating. Reaction mixtures which exhibit this behavior, and which therefore form a mixture of a Chevrel-phase and another material upon heating, may also be employed in processes according to this aspect of the present invention.

The further heating step may be conducted under vacuum, under a flowing inert gas or in a sealed reaction vessel with an inert atmosphere therein. Sealed vessels are generally less preferred from the standpoint of safety.

The further heating temperature typically is about 850° C. or more, and preferably about 975° C. or more. The duration of the further heating step should be sufficient for the reaction mixture to come to equilibrium. The exact time required will vary with the composition of the reaction mixture and the temperature, but times of about 12 to about 14 hours or more, typically are preferred.

After the further heating step, the resulting pure Chevrel-phase material or mixture of Chevrel-phase material and other material is cooled. Where the reaction mixture includes excess metal and chalcogen as mentioned above, the resulting metal chalcogenides may be removed from the product by washing in water or in dilute hydrochloric acid to provide a pure Chevrel-phase material. In the preferred forms of the invention however, where the Chevrel product is a pure Chevrel-phase material, no such additional washing step is required. The Chevrel-phase materials produced by processes according to this aspect of the present invention can be employed for the same purposes as Chevrel-phase materials made by known processes.

Examples of certain processes according to this aspect of the present invention are set forth below.

EXAMPLE 1

One gram-mole $NaHCO_3$, four gram-moles $MoS_2$ and two gram-moles free metallic Mo, all in finely powdered form, are blended by tumbling to form a precursor mixture. The precursor mixture is loaded into a reactor at room temperature and in an ordinary ambient air atmosphere. As the reactor is slowly heated from room temperature, the reactor is purged with pure, dry nitrogen. As the reactor temperature reaches about 270° C., the sodium bicarbonate decomposes. The gases evolved in decomposition are swept from the reactor by the flowing nitrogen. The reactor is maintained at slightly above 270° C. until gas evolution substantially ceases. The reactor is then further heated to a temperature of 975° C. and maintained at that temperature, for a dwell period of fourteen hours. The flow of nitrogen is continued during this dwell period. After the dwell period, the reactor is cooled to room temperature. The product is substantially pure Chevrel-phase $NaMo_6S_8$.

EXAMPLE 2

One-half gram-mole $Na_2CO_3$ is blended with four gram-mole $MoS_2$ to provide a precursor composition. The precursor composition is heated in a reactor under nitrogen until the reactor temperature rises above about 850° C., whereupon $Na_2CO_3$ begins to decompose and volatile decomposition products are evolved. The reactor is maintained at above 850° C. until evolution of gases from the mixture subsides. The reactor is then cooled, leaving an intermediate having overall stoichiometry $Na_{0.25}MoS_2$. The intermediate is then blended with two gram-moles of powdered free molybdenum, and the resulting reaction mixture is returned to the reactor and heated at 975° C. for about fourteen hours and then cooled. The resulting product is a substantially pure Chevrel-phase $NaMo_6S_8$.

EXAMPLE 3

0.75 gram-mole of anhydrous LiOH, 2.00 gram-mole of $MoS_2$ and 1.00 gram-mole of free metallic Mo, all in finely powdered form are thoroughly mixed to form a precursor composition. The precursor composition is loaded into a graphite container and placed within a stainless steel furnace tube. The tube is flushed with and the sample is heated under a flowing nitrogen gas blanket according to the following temperature schedule:

200° C.: 1 hour
450° C.: 1 hour
600° C.: 1 hour

As the LiOH decomposes, the gases evolved are swept from the reactor by the flowing nitrogen. The further heating steps are then performed as in Example 1. X-ray diffraction showed the sample to be pure Chevrel-phase material, a mixture of $Li_1Mo_6S_8$ and $Li_3Mo_6S_8$.

EXAMPLE 4

A precursor mixture is made by mixing six gram moles $LiNO_3$ and 4.5 gram moles $MoS_2$ with a slight additional amount of $LiNo_3$ to compensate for volatilization of Li during the process. This precursor mixture is treated in a process substantially as set forth in Example 2, utilizing a decomposition temperature of about 600° C. After volatilization of decomposition products, the resulting intermediate has the stoichiometric formula $Li_6Mo_{4.5}S_9$. 1.5 gram moles Mo are added to provide a reaction mixture corresponding to the formula $Li_6Mo_6S_9$. Upon further heating and cooling, the resulting product is a mixture of Chevrel-phase $Li_4Mo_6S_8$ and $Li_2S$. The $Li_2S$ is removed by aqueous washing, which also strips the lithium from the Chevrel-phase material leaving an unintercalated Chevrel-phase material $Mo_6S_8$.

EXAMPLE 5

A precursor composition is made combining one gram mole $LiNO_3$, one gram mole $NaNO_3$ and four gram moles $MoS_2$. The precursor composition is treated in a two-heat process substantially in accordance with Example 2 but using a decomposition temperature of above about 600° C. in the heating step. The resulting intermediate is blended with two gram moles free metallic Mo, and the resulting reaction product is further heated, again at about 975° C. The product upon cooling is a substantially pure Chevrel-phase material having stoichiometry $LiNaMo_6S_8$.

In accordance with a further embodiment of the invention, certain Chevrel-phase materials including non-lithium, non-molybdenum filler metals are employed as cathode materials in electrochemical cells having lithium-containing anodes. The filler metal is selected so that the filler metal is not displaced from the Chevrel-phase material upon intercalation of lithium to the Chevrel-phase material. In general, the desired resistance to displacement of the filler metal by lithium correlates with the rhombohedral angle of about 90° or less. Table II lists the rhombohedral angles for Chevrel-phase materials incorporating various filler metals which are not displaced upon intercalation of lithium.

TABLE I

| Chevrel Phase Material | Rhombohedral Angle |
| --- | --- |
| $BaMo_6S_8$ | 89.00 |
| $CaMo_6S_8$ | 89.88 |
| $KMo_6S_8$ | 89.14 |
| $NaMo_6S_8$ | 89.84 |
| $PbMo_6S_8$ | 89.45 |
| $SnMo_6S_8$ | 89.71 |

As used in this disclosure with reference to a Chevrel-phase material incorporating a particular filler metal should be understood as referring to the rhombohedral angle measured by standard X-ray diffraction techniques utilizing a sample of the material having no other intercalated metal. Thus, the rhombohedral angle may change as lithium is intercalated into the crystal structure, but the rhombohedral angle should be understood as given with respect to the crystal structure without any intercalated lithium. Thus, where the term "rhombohedral angle" is used with reference to a Chevrel-phase material having the overall stoichiometric formula $Li_xM_qMo_6Z_n$ where M is the filler metal, Z is chalcogen and x represents the variable amount of lithium in the structure, the rhombohedral angle should be understood as the rhombohedral angle of the corresponding structure without any lithium i.e., with $x=0$, having the same filler metal M and the same values of q and n.

As will be appreciated with reference to Table I, the preferred cathode materials utilized in cells according to this aspect of the present invention have filler metals selected from the group consisting of Ba, Ca, K, Na, Pb and Sn. The filler metal may also incorporate combinations of these elements. Na, Ca and combinations thereof are particularly preferred, and Na is especially preferred. Also, the amount of filler metal in the Chevrel-phase material preferably corresponds to $q \doteq 1$ in the stoichiometric formula $Li_xM_qMo_6Z_n$. The chalcogen component preferably consists essentially of sulfur, and the amount of chalcogen preferably corresponds to values of n between about 7.5 to about 8.5 and more preferably about 8. Similar results can be achieved with Chevrel-phase materials incorporating other chalcogens (Se, Te or O) alone or in combination with one another or with S, but O should constitute no more than about 25% of the chalcogen.

Chevrel-phase materials incorporating the preferred filler metals may be synthesized by the techniques discussed above. Preferably, the single-heat or two-heat process discussed above is utilized with a heat-labile compound incorporating the desired filler metal, and the composition of the reaction mixture is selected so that the substantially pure Chevrel-phase material incorporating the filler metal is obtained. The Chevrel-phase material containing the filler metal, typically without lithium, is then fabricated into a conventional cathode as by binding the Chevrel-phase material in particulate form with a suitable polymeric binder such as the polymer formed from ethylene propylene diene monomer ("EPDM") or polytetrafluorethylene ("PTFE") and a suitable metallic cathode current collector. Thus, the particulate Chevrel-phase material and binder may be deposited on a metallic strip or sheet forming the cathode current collector. The cathode and cathode collector may be assembled with a suitable lithium-containing anode, typically a sheet of substantially pure lithium foil, a separator such as a sheet of porous polypropylene and an electrolyte.

The electrolyte may be of the same types as normally utilized with other cells incorporating both a lithium anode and a cathode material incorporating molybdenum and a chalcogen. Such conventional electrolytes typically incorporate non-aqueous solvent systems together with a lithium salt. Solvent systems employed in conventional lithium-based cells with molybdenum and sulfur-containing cathode materials have included propylene carbonate, ethylene carbonate and mixtures of these. As set forth in co-pending commonly assigned U.S. patent application Ser. No. 076,031, filed July 21, 1987, mixtures of 2-methyltetrahydrafuran with propylene carbonate, ethylene carbonate or with both propylene carbonate and ethylene carbonate are particularly useful solvent systems. Many different salts can be employed in the electrolytes as for example, $LiAsF_6$, $LiPF_6$, $LiI$, $LiBr$, $LiBF_4$, $LiAlCl_4$ and $LiCF_3SO_3$ and mixtures thereof. $LiPF_6$, $LiI$ and $LiAsF_6$ and mixtures thereof are more preferred, and $LiAsF_6$ is especially preferred.

Immediately upon assembly, the cell is ready for use. There is no need for any preliminary discharge under controlled conditions or the like.

As the cell discharges, lithium is intercalated in the Chevrel-phase material of the cathode. With the intercalated lithium, the overall stoichiometric formula of the Chevrel phase material is given by $Li_xM_qMo_6Z_n$. Electrical energy is released upon intercalation of lithium into the Chevrel-phase material. The cell voltage varies with the state of charge of the cell, i.e., with x in the aforementioned stoichiometric formula. In general, cells according to this aspect of the present invention behave in substantially the same way as cells including a conventional Chevrel-phase material without a filler metal. Because the filler metal is permanently incorporated in the Chevrel-phase material, cells according to this aspect of the present invention operate over only a portion of the charge/discharge cycle typically associated with the corresponding cells without a filler material. As illustrated in FIG. 1, a conventional cell with a Chevrel-phase material cathode of the form $Li_xMo_6S_8$ can operate over the range from about $x=0$ to about $x=4$, with the value of x in this conventional cell cathode material being indicated on the upper horizontal axis. The corresponding cell according to one embodiment of the present invention, with a sodium filler material in the corresponding Chevrel-phase cathode material $Li_xNaMo_6S_8$ operates along substantially the same charge and discharge curves, but only over the range indicated by the value $x=0$ to $x=3$ on the lower horizontal axis. Thus, cells with the filler material do not operate along the portions of the charge and discharge curves indicated by broken lines in the figure. As will be appreciated, the voltage for a cell with the filler material at a given value of x in the formula $Li_xNaMo_6S_8$ corresponds to the voltage for the conventional cell at a higher value of x in the formula $Li_xMo_6S_8$. Although the present invention is not limited by any theory of operation, it is believed that this behavior is attributable to the action of the filler metals in occupying some of the same interstitial sites as ordinarily occupied by lithium in cells without the filler material.

The theoretical charge capacity of cells according to this aspect of the present invention may be less than the theoretical capacity of the corresponding cells without the filler material. However, this difference is not particularly significant inasmuch as the "lost" charge capacity is not useful in certain battery systems. Thus, the solid line portions of the operating curves in FIG. 1 represent charge and discharge at substantially constant voltage with a gradual decline as the cell approaches complete discharge. By contrast, the broken line portion of the operating curve, representing the charge capacity "lost" in cells according to this aspect of the present invention, represents charge and discharge at sharply varying voltages and at voltages differing from those prevailing over the remainder of the useful charge capacity. These different voltages typically are not desired in electronic systems and other systems.

As will be appreciated from the discussion of synthesis methods set forth above, Chevrel-phase materials incorporating the preferred filler metals can be synthesized readily from inexpensive starting materials. Therefore, the cells incorporating the Chevrel-phase materials according to this aspect of the present invention can be made economically.

As will be readily appreciated, numerous variations and combinations of the features set forth above can be utilized without departing from the present invention as set forth in the claims. Accordingly, the foregoing description and examples should be taken by way of illustration rather than by way of limitation of the present invention as defined in the claims.

We claim:

1. An electrochemical cell incorporating a lithium-containing anode, an electrolyte and a cathode including a Chevrel-phase material of stoichiometry $Li_xM_qMo_6Z_n$ where x is zero or above and varies with the state of charge of the cell; M is a filler metal selected from the group consisting of Ba, Ca, K, Na and mixtures thereof; q is greater than zero and less than about 1.00; Z is a chalcogen and n is between about 7.5 and 8.5, and wherein said filler metal is substantially resistant to replacement by lithium upon intercalation of lithium into said chevrel-phase material during discharge of said cell.

2. A cell as claimed in claim 1 wherein said Chevrel-phase material has substantially rhombohedral structure with a rhombohedral angle less than or equal to about 90°.

3. A cell as claimed in claim 1 wherein q is about 1.

4. A cell as claimed in claim 1 wherein said filler metal is selected from the group consisting of Ca, Na and mixtures thereof.

5. A cell as claimed in claim 4 wherein said filler metal consists essentially of Na.

6. A cell as claimed in claim 5 wherein said chalcogen consists essentially of sulfur.

7. A cell as claimed in claim 6 wherein n is about 8.

8. A composition of matter including a chevrel-phase material conforming to the stoichiometric formula $Li_xM_qMo_6Z_n$ wherein x is above zero; M is a filler metal selected from the group consisting of Ba, Ca, K, Na and mixtures thereof; q is greater than zero and less than about 1.00; Z is a chalcogen and n is between about 7.5 and 8.5 and wherein said filler metal is substantially resistant to replacement by lithium upon intercalation of lithium into said chevrel-phase material.

9. A composition as claimed in claim 8 wherein said Chevrel-phase material has substantially rhombohedral structure with a rhombohedral angle less than or equal to about 90°.

10. A composition as claimed in claim 8 wherein q is about 1, said filler metal is K, Na or combinations thereof, said chalcogen consists essentially of sulfur, and n is about 7.5 to about 8.5.

* * * * *